(12) United States Patent
Feng et al.

(10) Patent No.: US 8,461,486 B2
(45) Date of Patent: Jun. 11, 2013

(54) HEATING TILE AND HEATED FLOOR USING THE SAME

(75) Inventors: Chen Feng, Beijing (CN); Liang Liu, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 230 days.

(21) Appl. No.: 12/860,670

(22) Filed: Aug. 20, 2010

(65) Prior Publication Data

US 2011/0204038 A1     Aug. 25, 2011

(30) Foreign Application Priority Data

Feb. 23, 2010  (CN) .......................... 2010 1 0112386

(51) Int. Cl.
    *H05B 3/36*     (2006.01)
(52) U.S. Cl.
    USPC .......................................................... 219/213
(58) Field of Classification Search
    USPC .................................. 219/213, 217; 392/432
    See application file for complete search history.

(56) References Cited

U.S. PATENT DOCUMENTS

| | | | | |
|---|---|---|---|---|
| 6,073,408 A * | 6/2000 | Winer et al. | ..................... | 52/385 |
| 6,498,592 B1 * | 12/2002 | Matthies | ........................ | 345/1.1 |
| 8,138,457 B2 * | 3/2012 | Seo | ................................. | 219/548 |
| 8,270,639 B2 * | 9/2012 | Jiang et al. | ..................... | 381/164 |
| 2004/0149711 A1 * | 8/2004 | Wyatt et al. | ..................... | 219/217 |
| 2004/0175164 A1 * | 9/2004 | Loktev et al. | .................. | 392/436 |
| 2006/0272631 A1 * | 12/2006 | Coke et al. | ............. | 126/271.2 A |
| 2008/0047946 A1 * | 2/2008 | Van Klompenberg et al. | ............................. | 219/213 |
| 2008/0264929 A1 * | 10/2008 | Seo | ................................. | 219/548 |
| 2009/0085461 A1 | 4/2009 | Feng et al. | | |
| 2011/0253694 A1 * | 10/2011 | Consiglio | ..................... | 219/213 |

FOREIGN PATENT DOCUMENTS

| | | |
|---|---|---|
| CN | 2483639 | 3/2002 |
| CN | 2585927 | 11/2003 |
| CN | 101400198 | 4/2009 |

* cited by examiner

*Primary Examiner* — Nathan Ha
(74) *Attorney, Agent, or Firm* — Altis Law Group, Inc.

(57) ABSTRACT

A heating tile includes an upper substrate, a lower substrate and a heating module. The heating module is disposed between the upper substrate and the lower substrate. The heating module includes a first electrode, a second electrode and a heating element being electrically connected with the first electrode and the second electrode. The heating element includes a carbon nanotube layer structure. The heating tile defines a first side surface and a second side surface opposite to the first side surface. The first electrode and the second electrode are both oriented from the first side surface to the second side surface. The first electrode includes two exposed first ends. The second electrode includes two exposed second ends.

9 Claims, 18 Drawing Sheets

HEATING TILE AND HEATED FLOOR USING THE SAME

RELATED APPLICATIONS

This application claims all benefits accruing under 35 U.S.C. §119 from China Patent Application No. 201010112386.7, filed on Feb. 23, 2010 in the China Intellectual Property Office, the contents of which are hereby incorporated by reference.

BACKGROUND

1. Technical Field

The present disclosure generally relates to heating tiles and heated floor using the same.

2. Description of Related Art

It is well known that, floors have features of wet resistance, cold resistance, and are necessary for household decoration. In order to solve the heating problems in winter, radiant heating devices are used widely in homes.

Many radiant heating devices are made of pipes filled with water and are always covered by flooring in homes. However, if there is a problem with the pipes, water could flow out to destroy the floor. Further, as conventional radiant heating devices are covered by the floors, the floors have to be moved or destroyed to repair the radiant heating device, and it is expensive.

What is needed, therefore, is a heating tile and a heating floor using the same that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
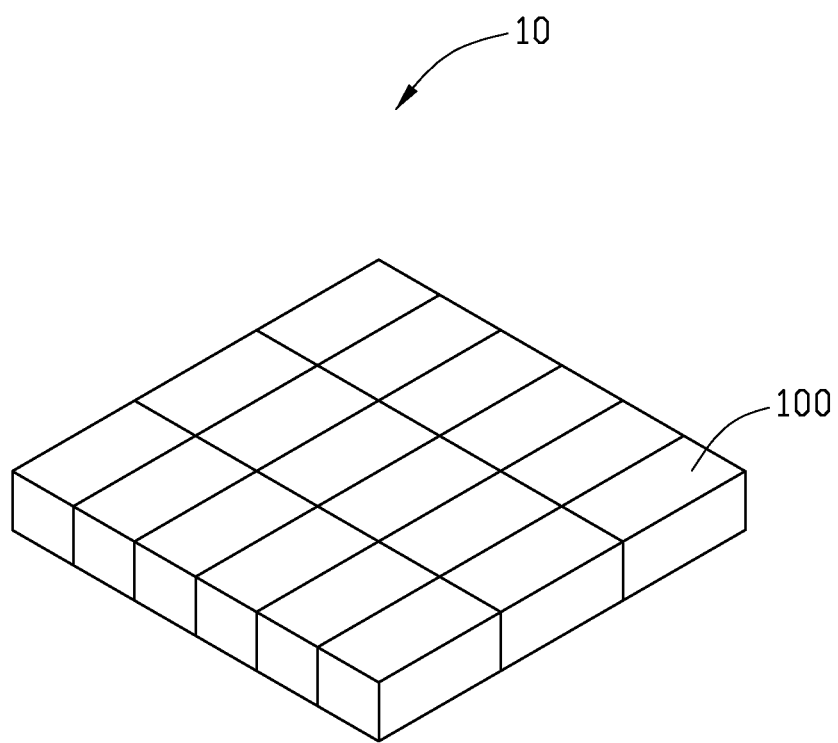
FIG. 1 is a schematic view of one embodiment of a heating floor.

Referring to FIG. 1, a heating floor 10 according to one embodiment is shown. The heating floor 10 includes a plurality of heating tiles 100 disposed side by side. The plurality of heating tiles 100 are arranged to form a plurality of lines and rows. The plurality of heating tiles 100 can be fixed with each other by adhesive or other known means.

Figure 2:
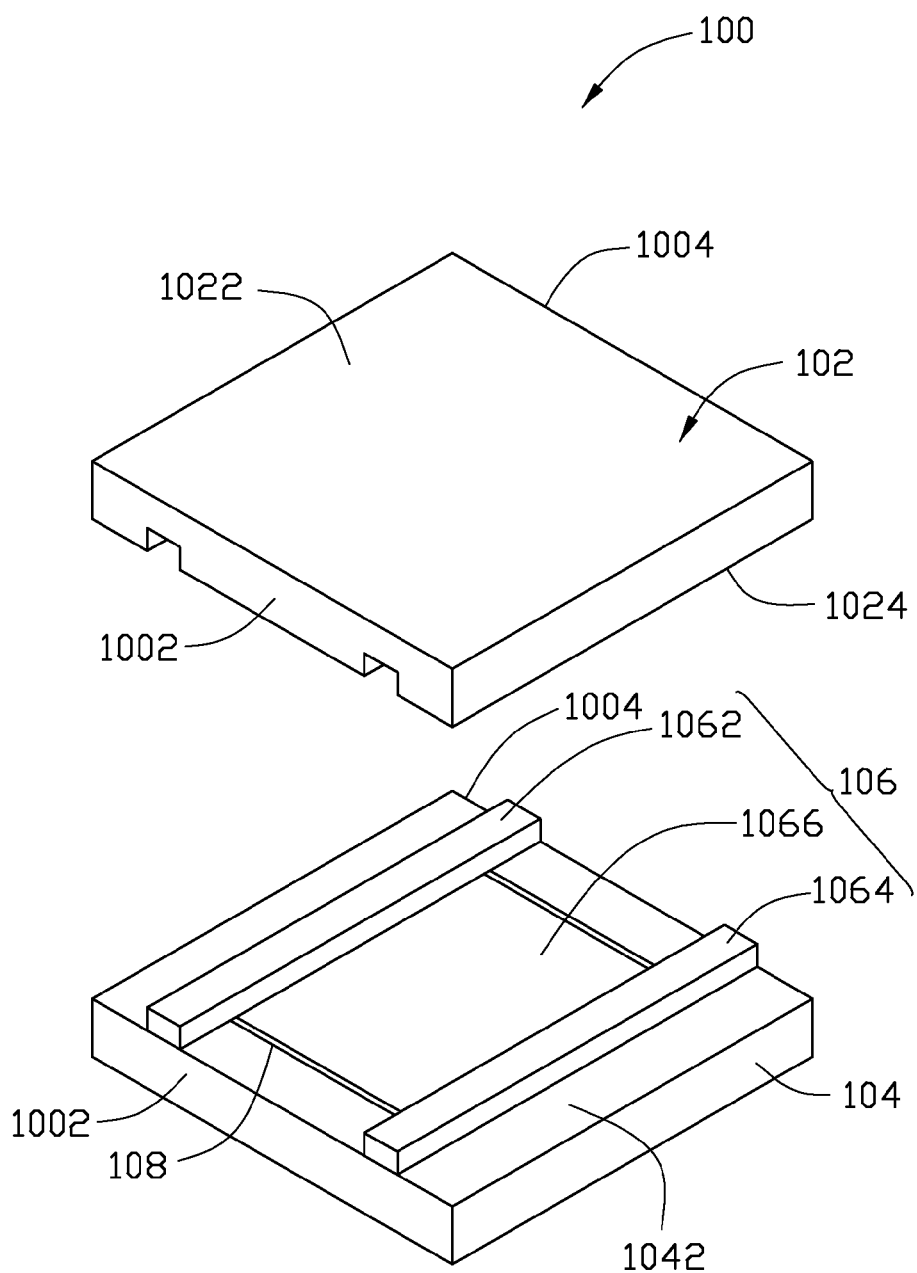
FIG. 2 is a schematic, exploded view of one embodiment of a heating tile used in the heating floor in FIG. 1.
Figure 3:
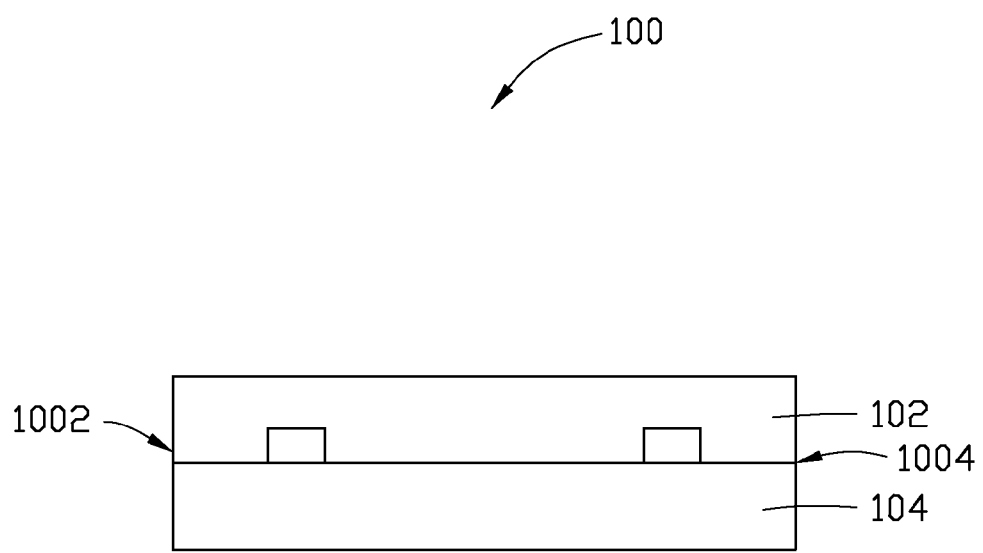
FIG. 3 is a schematic, side view of the heating tile in FIG. 2.

Referring to FIGS. 2 and 3, each heating tile 100 includes an upper substrate 102, a lower substrate 104 and a heating module 106 disposed between the upper substrate 102 and the lower substrate 104. The heating module 106 includes a heating element 1066, a first electrode 1062 and a second electrode 1064. The first electrode 1062 and the second electrode 1064 are separately disposed on two opposite ends of the heating element 1066 and electrically connected with the heating element 1066. The heating tile 100 further includes a first side surface 1002 and a second side surface 1004 opposite to the first side surface 1002. The first side surface 1002 includes a side surface of the upper substrate 102 and a side surface of the lower substrate 104. The second side surface 1004 includes another side surface of the upper substrate 102 and another side surface of the lower substrate 104.

The lower substrate 104 is configured for supporting the heating module 106. The lower substrate 104 can be a porous substrate, a plane substrate, or a frame. The lower substrate 104 can be made of dielectric material which may be ceramic, glass, wood, or quartz. In one embodiment, the material of the lower substrate 104 is heat insulated and heat resistant, such as wood. A thickness of the lower substrate 104 can be determined according to the user's practical needs. For example, the thickness of the lower substrate 104 can be in a range from about 0.5 centimeters to about 2 centimeters.

The upper substrate 102 covers the heating module 106. The upper substrate 102 is configured for keeping the heating module 106 away from contamination from the surroundings, and can also protect the user from getting an electric shock when touching the heating tile 100. The material of upper substrate 102 is dielectric, such as resin, ceramic, plastic, or wood. In one embodiment, the material of the upper substrate 102 is heat insulated and heat resistant. The upper substrate 102 will diffuse the heat and keep a temperature of the surface of the heating tile 100 low. Thus, human skin can come into direct contact with the heating tile 100. The upper substrate 102 can also be used as a heat preservation, the heat produced by the heating module 106 can be preserved by the upper substrate 102. The material of the upper substrate 102 can be ceramic, plastics or resin. The upper substrate 102 includes an upper surface 1022 and a lower surface 1024 opposite the upper surface 1022. The lower surface 1024 contacts the heating module 106. The upper substrate 102 can further include at least one blind groove, in which the heating modules 106, or parts thereof, are disposed.

An adhesive or a mechanical means positions the heating element 1066 on a surface of the lower substrate 104. An area of the heating element 1066 should be smaller than an area of the surface of the lower substrate 104 so the heating tiles 100 will not short with each other when they are disposed side by side.

The heating element 1066 can be a carbon nanotube layer structure. The carbon nanotube layer structure can be planar. The carbon nanotube layer structure can be a freestanding structure (it can be supported by itself without a substrate, such that when at least one point of the carbon nanotube layer structure is held, the entire carbon nanotube layer structure can be lifted without being destroyed). The carbon nanotube layer structure includes a plurality of carbon nanotubes joined by Van der Waals attractive force therebetween. The carbon nanotube layer structure can be a substantially pure structure of the carbon nanotubes, with few impurities. The carbon nanotubes can be used to form many different structures and provide a large specific surface area. The heat capacity per unit area of the carbon nanotube layer structure can be less than $2\times10^{-4}$ $J/m^2*K$. In one embodiment, the heat capacity per unit area of the carbon nanotube layer structure is less than or equal to $1.7\times10^{-6}$ $J/m^2*K$. Because the heat capacity of the carbon nanotube layer structure is very low, the temperature of the heating element 1066 can rise and fall quickly, and has a high heating response speed. Thus, the heating element 1066 has a high heating efficiency and accuracy. In addition, because the carbon nanotube layer structure can be substantially pure, the carbon nanotubes are not easily oxidized and the lifespan of the heating element 1066 will be relatively long, even when exposed to the elements. Furthermore, because the carbon nanotubes have a low density, about 1.35 $g/cm^3$, thus the heating element 1066 is light. As the heat capacity of the carbon nanotube layer structure is very low, a temperature of the heating element 1066 can increase and decrease quickly. Because the carbon nanotube has a large specific surface area, the carbon nanotube layer structure with a plurality of carbon nanotubes has a large specific surface area. The carbon nanotube layer structure is adhesive and can be directly applied to a surface if the specific surface of the carbon nanotube layer structure is large enough.

The carbon nanotubes in the carbon nanotube layer structure can be orderly or disorderly arranged. The term 'disordered carbon nanotube layer structure' includes to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has properties identical in all directions of the carbon nanotube layer structure. The carbon nanotubes in the disordered carbon nanotube layer structure can be entangled with each other.

The carbon nanotube layer structure including ordered carbon nanotubes is an ordered carbon nanotube layer structure. The term 'ordered carbon nanotube layer structure' includes to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer structure can be selected from single-walled, double-walled, and/or multi-walled carbon nanotubes.

The carbon nanotube layer structure can be a film structure with a thickness ranging from about 0.5 nanometers (nm) to about 1 mm. The carbon nanotube layer structure can include at least one carbon nanotube film.

Figure 4:
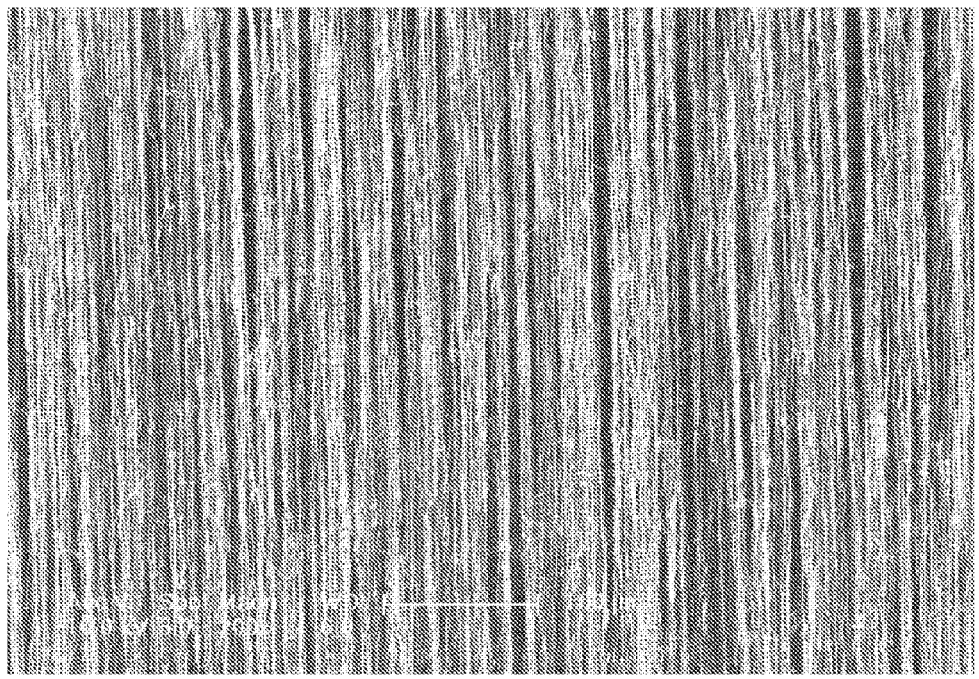
FIG. 4 is a Scanning Electron Microscope (SEM) image of a drawn carbon nanotube film.

In one embodiment, referring to FIG. 4, the carbon nanotube film is a drawn carbon nanotube film. A film can be drawn from a carbon nanotube array, to obtain a drawn carbon nanotube film. The drawn carbon nanotube film includes a plurality of successive and oriented carbon nanotubes joined end-to-end by Van der Waals attractive force therebetween. The drawn carbon nanotube film is a free-standing film. Each drawn carbon nanotube film includes a plurality of successively oriented carbon nanotube segments joined end-to-end by Van der Waals attractive force therebetween. Each carbon nanotube segment includes a number of carbon nanotubes substantially parallel to each other, and joined by Van der Waals attractive force therebetween. Some variations can occur in the drawn carbon nanotube film. The carbon nanotubes in the drawn carbon nanotube film are oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 μm.

The carbon nanotube layer structure of the heating element 1066 can include at least two stacked carbon nanotube films. In other embodiments, the carbon nanotube layer structure can include two or more coplanar carbon nanotube films. Additionally, when the carbon nanotubes in the carbon nanotube film are aligned along one preferred orientation (e.g., the drawn carbon nanotube film) an angle can exist between the orientations of carbon nanotubes in adjacent films, whether stacked or adjacent. Adjacent carbon nanotube films can be joined by only the Van der Waals attractive force therebetween. The number of the layers of the carbon nanotube films is not limited. However, the thicker the carbon nanotube layer structure, the larger the specific surface area will decrease. An angle between the aligned directions of the carbon nanotubes in two adjacent carbon nanotube films can range from about 0 degrees to about 90 degrees. When the angle between the aligned directions of the carbon nanotubes in adjacent carbon nanotube films is larger than 0 degrees, the carbon nanotubes in the heating element 1066 define a microporous structure. The carbon nanotube layer structure in an embodiment employing these films will have a number of micropores. Stacking the carbon nanotube films will also add to the structural integrity of the carbon nanotube layer structure.

Figure 5:
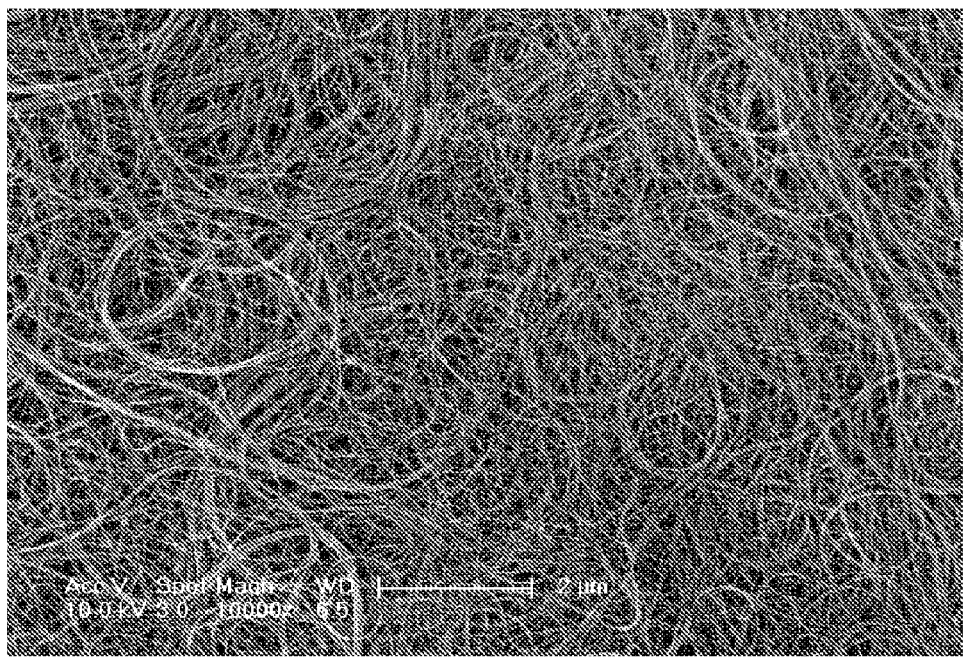
FIG. 5 is an SEM image of a flocculated carbon nanotube film.

In other embodiments, referring to FIG. 5, the carbon nanotube film can be a flocculated carbon nanotube film. The flocculated carbon nanotube film can include a number of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by Van der Waals attractive force to obtain an entangled structure with micropores defined therein. The flocculated carbon nanotube film is very porous. Sizes of the micropores can be less than 10 μm. The porous nature of the flocculated carbon nanotube film will increase the specific surface area of the carbon nanotube layer structure. Further, due to the carbon nanotubes in the carbon nanotube layer structure being entangled with each other, the carbon nanotube layer structure employing the flocculated carbon nanotube film has excellent durability, and can be fashioned into desired shapes with a low risk to the integrity of the carbon nanotube layer structure. The thickness of the flocculated carbon nanotube film can range from about 0.5 nm to about 1 mm.

Figure 6:
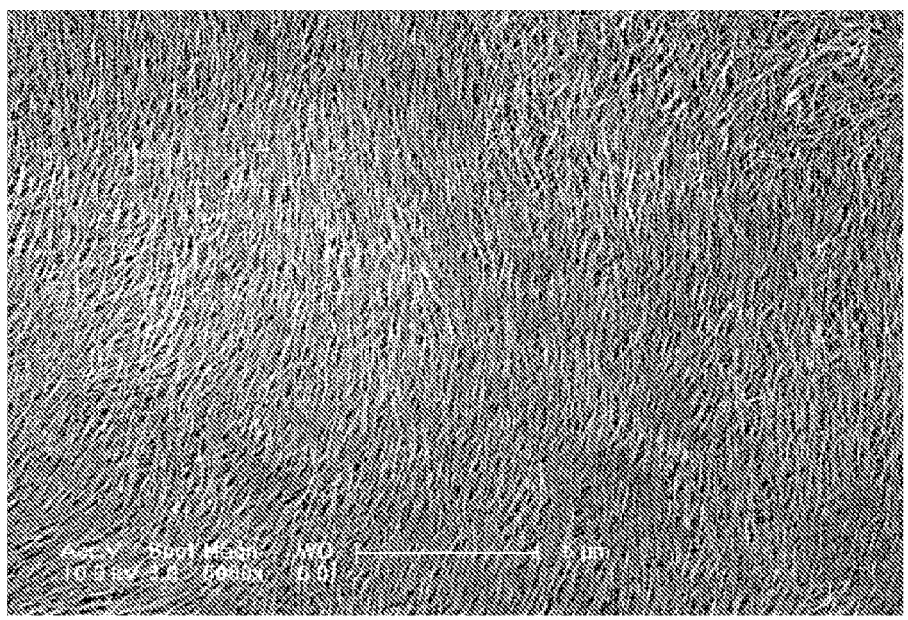
FIG. 6 is an SEM image of a pressed carbon nanotube film.

In other embodiments, referring to FIG. 6, the carbon nanotube film can be a pressed carbon nanotube film. The pressed carbon nanotube film can be a free-standing carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by Van der Waals attractive force. An angle between a primary alignment direction of the carbon nanotubes and a surface of the pressed carbon nanotube film is about 0 degrees to approximately 15 degrees. The greater the pressure applied, the smaller the angle obtained. When the carbon nanotubes in the pressed carbon nanotube film are arranged along different directions. The carbon nanotube film can have properties that are identical in all directions substantially parallel to a surface of the carbon nanotube film. The thickness of the pressed carbon nanotube film ranges from about 0.5 nm to about 1 mm.

Figure 7:
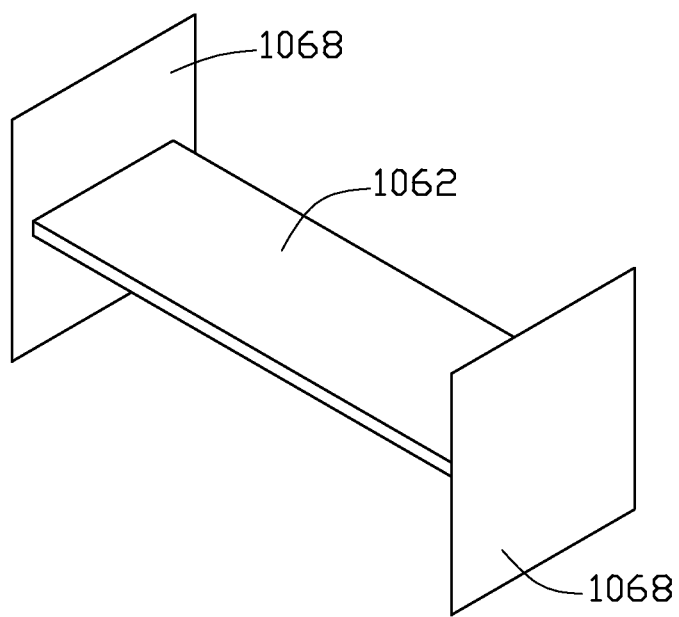
FIG. 7 is a schematic view of another embodiment of a first electrode of a heating tile used in a heating tile, wherein the first electrode includes two first conductive sheets.
Figure 8:
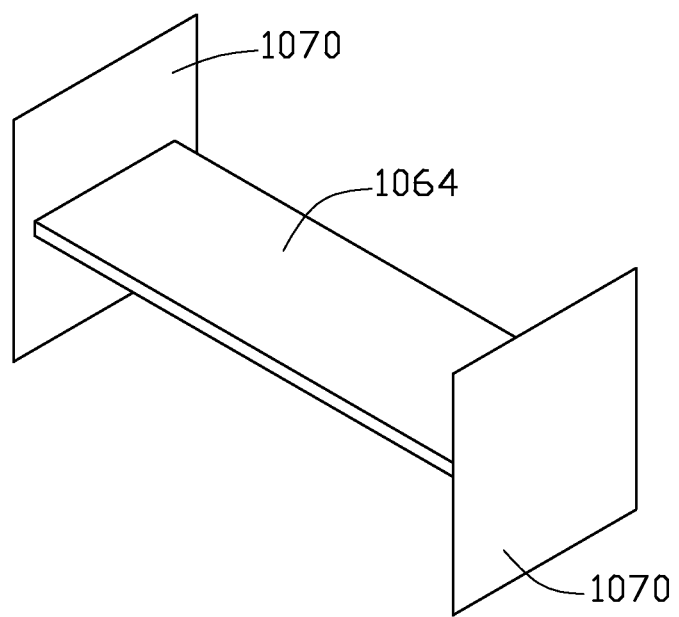
FIG. 8 is a schematic view of another embodiment of a second electrode of a heating tile used in a heating tile, wherein the second electrode includes two second conductive sheets.

The first electrode 1062 and the second electrode 1064 can be fixed on the surface of the heating element 1066 by conductive adhesive (not shown). The first electrode 1062 and the second electrode 1064 are made of conductive material. The shapes of the first electrode 1062 and the second electrode 1064 can be wire-shaped or bar-shaped. The cross sectional shape of the first electrode 1062 and the second electrode 1064 can be round, square, trapezium, triangular, or polygonal. The thickness of the first electrode 1062 and the second electrode 1064 can be any size, depending on the design, and can be about 1 micrometer to about 1 centimeter. The first electrode 1062 and the second electrode 1064 are oriented from the first side surface 1002 to the second side surface 1004. The first electrode 1062 includes two exposed first ends exposed to the first side surface 1002 and the second side surface 1004 separately. That is to say, the two exposed first ends of the first electrode 1062 are coplanar with or protrude from the first side surface 1002 and the second side surface 1004. The second electrode 1064 includes two exposed second ends exposed to the first side surface 1002 and the second side surface 1004 separately. That is to say, the two ends of the second electrode 1064 are coplanar with or protrude from the first side surface 1002 and the second side surface 1004. In one embodiment, the first electrode 1062 and the second electrode 1064 can be substantially parallel with each other. Referring to FIG. 7, the first electrode 1062 includes two first conductive sheets 1068 disposed on the two ends of the first electrode 1062. The two first conductive sheets 1068 are disposed on the first side surface 1002 and the second side surface 1004 separately. Referring to FIG. 8, the second electrode 1064 includes two second conductive sheets 1070 disposed on the two ends of the second electrode 1064. The two second conductive sheets 1070 are disposed on the first side surface 1002 and the second side surface 1004 separately. When the heating tiles 100 are disposed side by side to form the heating floor 10, in every two adjacent heating tiles 100, the first side surface 1002 of one heating tile 100 is contacting with the second side surface 1004 of another heating tile 100. Because the first conductive sheets 1068 are separately disposed on the first side surface 1002 and the second side surface 1004, the second conductive sheets 1070 are separately disposed on the first side surface 1002 and the second side surface 1004. The first electrodes 1062 in every two adjacent heating tiles 100 are electrically connected with each other, the second electrodes 1064 in the two adjacent heating tiles 100 are electrically connected with each other. In one embodiment, when the heating element 1066 includes the carbon nanotube layer structure having a plurality of carbon nanotubes arranged in a same direction, the axes of the carbon nanotubes can be substantially perpendicular to the first electrode 1062 and the second electrode 1064.

In other embodiments, the heating tile 100 can further include a heat-reflective layer 108. The heat-reflective layer 108 is configured to reflect the heat emitted by the heating module 106 back, and control the direction of the heat emitted by the heating module 106 for single-side heating. The material of the heat-reflective layer 108 can be insulated materials. The insulated materials can be metal oxides, metal salts, or ceramics. The heat-reflective layer 108 can also be IR-reflective material, such as $TiO_2$—Ag—$TiO_2$, ZnS—Ag—ZnS, AlNO—Ag—AlN, $Ta_2O_3$—SiO or $Nb_2O_3$—$SiO_2$. Because the heating element 1066 includes a carbon nanotube layer structure, the heat being generated from the carbon nanotube layer structure is eradiated in the form of IR, the IR-reflective material has a good reflective effect for heat. The thickness of the heat-reflective layer 108 can be in a range from about 10 μm to about 0.5 mm.

Figure 9:
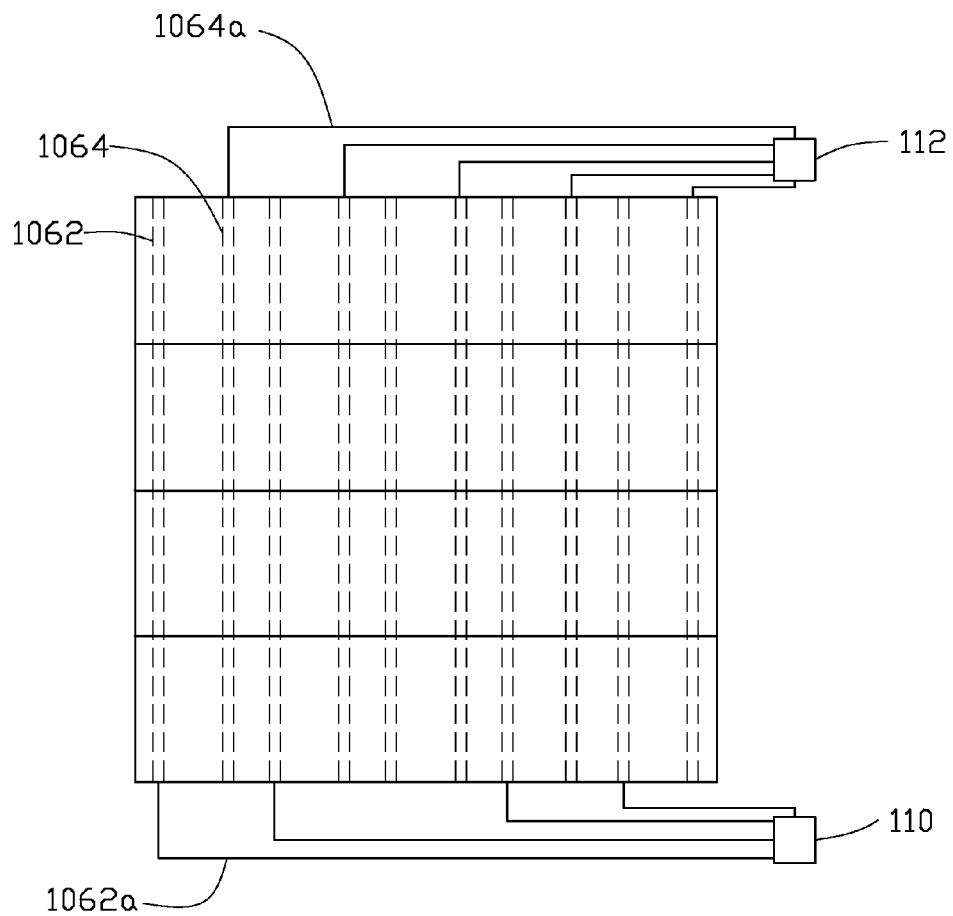
FIG. 9 is a schematic top scenograph of the heating floor in FIG. 1.

Referring to FIG. 9, the heating floor 10 includes a number of heating tiles 100 disposed side by side to form a number of lines and a number of rows. In every row, every two adjacent heating tiles 100 are electrically connected with each other. In use, by controlling the voltage between the first electrode 1062 and the second electrode 1064 of one heating tile 100 in every row, the working status and temperature of every heating tile 100 in this row can be controlled. The first electrode 1062 of one heating tile 100 of every line can be electrically connected with each other at a first point 110 via a plurality of first electrode wires 1062a, the second electrode 1064 of the heating tile of every line can be electrically connected with each other at a second point 112 via a plurality of second electrode wire 1064a. By controlling the voltage between the first point and the second point, the working status and the temperature of the heating floor 10 can be controlled.

The heating tile 100 and the heating floor 10 have numerous advantages: first, the heating tile 100 and the heating floor 10 generate heat via joule heat, pipes filled with water are not needed, as such, there is no water leaking problem. Second, the heating elements 1066 of the heating tile 100 and the heating floor 10 including carbon nanotube layer structure has a light weight, and the heating tile 100 and the heating floor 10 are light and can be conveniently used. Third, the temperature of the heating tile 100 and the heating floor 10 can be easily controlled by controlling the voltage. Last, the heating tile 100 and the heating floor 10 are exposed and can be conveniently maintained if there is a problem with any of them. If there is a problem with an individual tile, the individual tile can be replaced.

Figure 10:
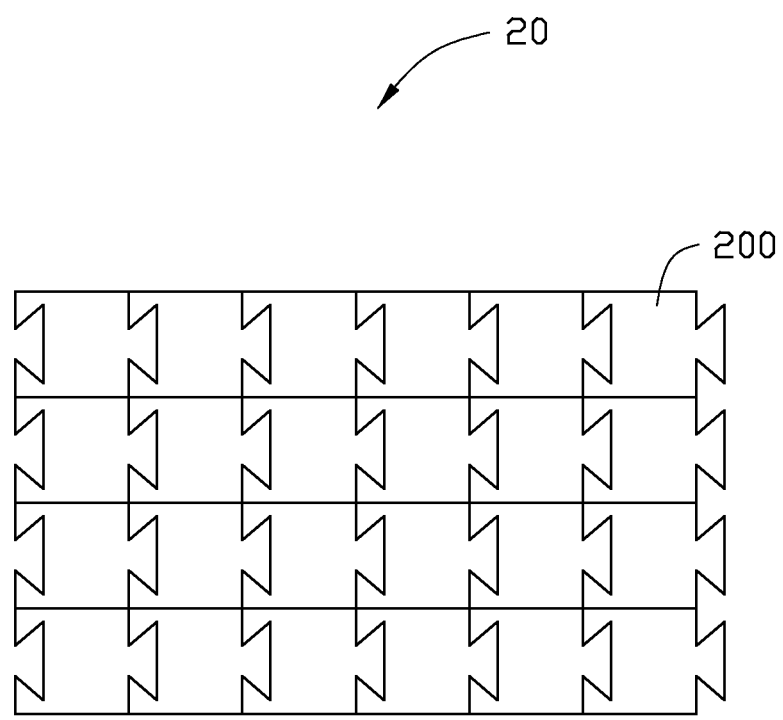
FIG. 10 is a schematic top plan view of another embodiment of a heating floor.

Referring to FIG. 10 a heating floor 20 according to another embodiment is provided. The heating floor 20 includes a number of heating tiles 200 disposed side by side to form a number of rows and lines.

Figure 11:
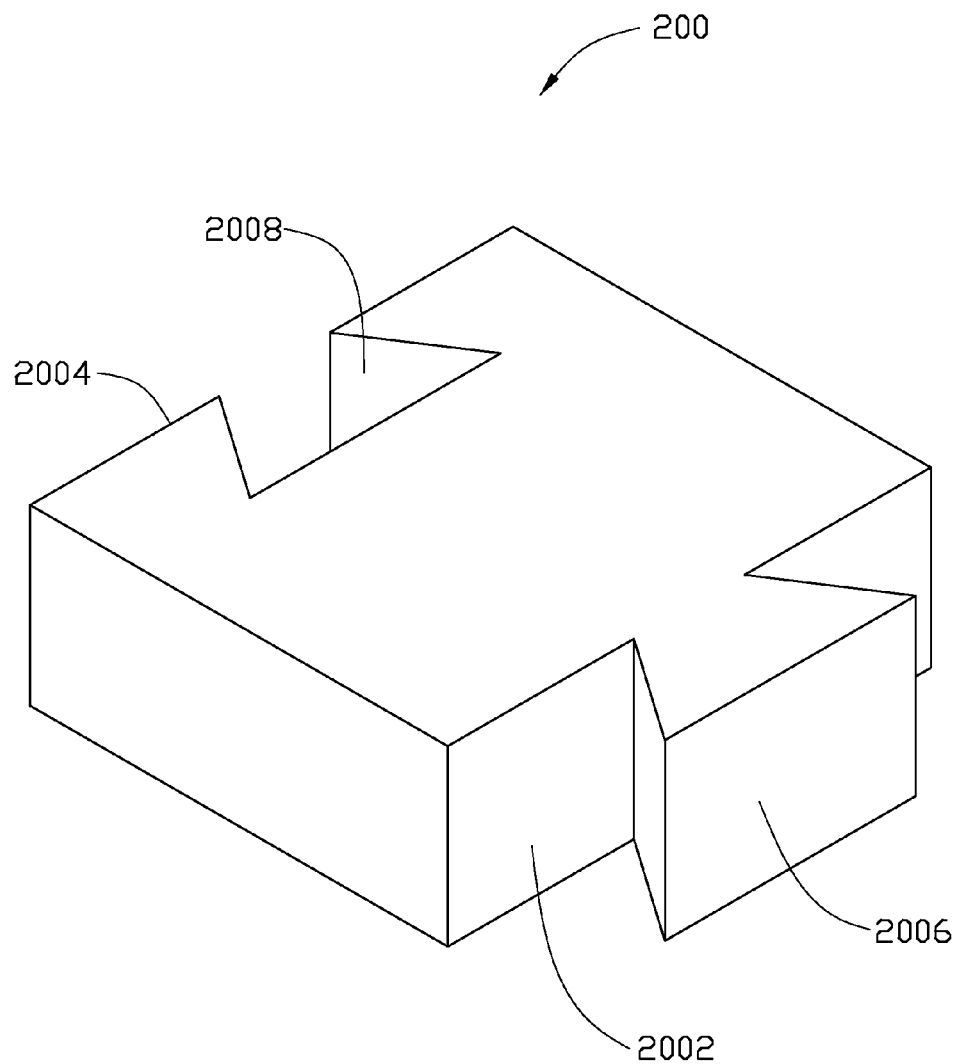
FIG. 11 is a schematic top plan view of a heating tile used in the heating floor of FIG. 8.

Referring to FIGS. 10 and 11, the heating tile 200 includes a first side surface 2002 and a second side surface 2004. In every two adjacent heating tiles 200 of every line, the first side surface 2002 of one heating tile 200 is contacting with the second side surface 2004 of another heating tile 200. The heating tile 200 further includes a pin 2006 extending from the first side surface 2002 and a tail 2008 at the second side surface 2004 defining a dovetail joint for connecting the heating tiles 200. The pin 2006 of one heating tile 200 is engaged in the tail 2008 of another heating tile 200. The heating tile 200 can be fixed with each other by the engagement of the adjacent pin 2006 and tail 2008 without adhesive.

Other characteristics of the heating tile 200 are the same as the heating tile 100 disclosed above. Other characteristics of the heating floor 20 are the same as the heating floor 10 disclosed above.

Figure 12:
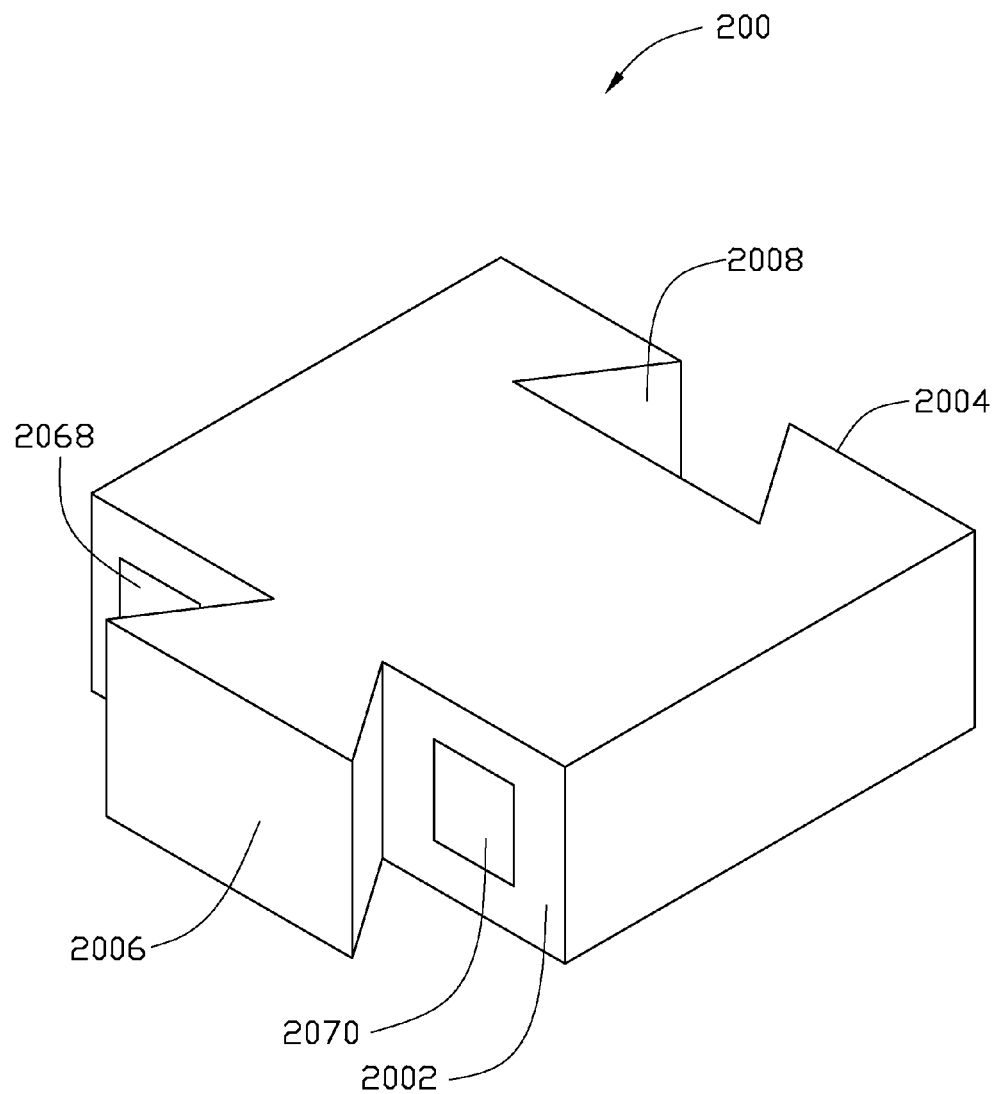
FIG. 12 is a schematic view of the heating tile in FIG. 9.
Figure 13:
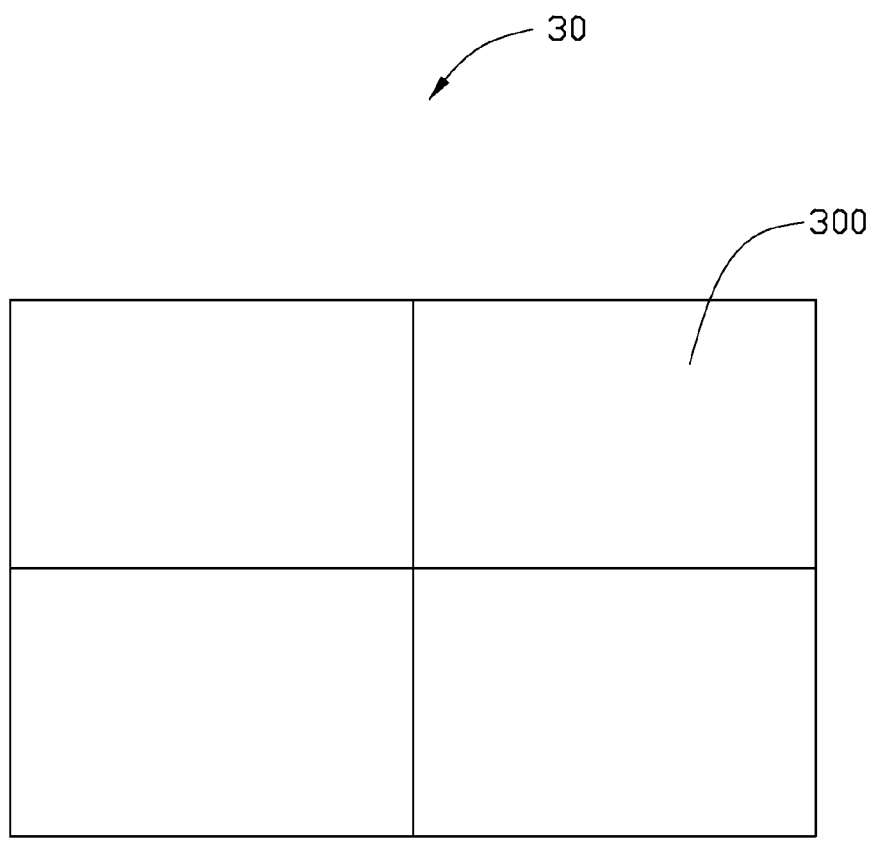
FIG. 13 is a schematic top plan view of yet another embodiment of a heating floor.
Figure 14:
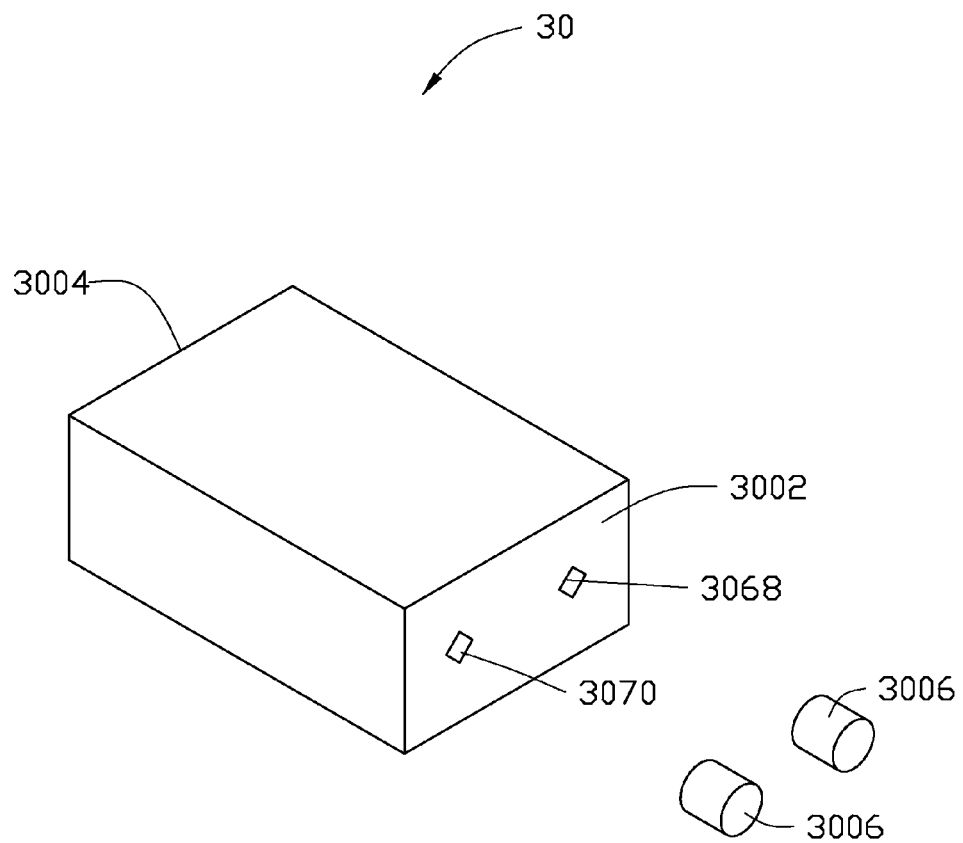
FIG. 14 is schematic exploded view of a heating tile used in the heating floor of FIG. 13.
Figure 15:
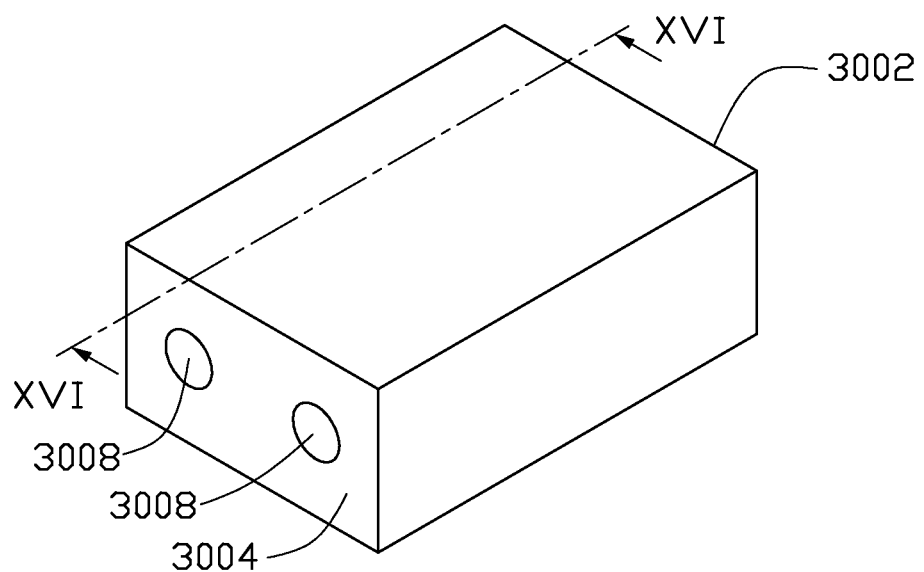
FIG. 15 is a schematic view of the heating tile in FIG. 14.
Figure 16:
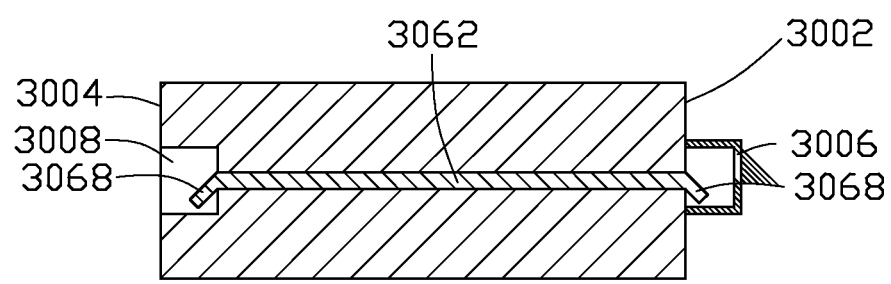
FIG. 16 is a schematic, cross-sectional view, along a line XVI-XVI of FIG. 15.

Referring to FIG. 12, a heating floor 30 according to yet another embodiment is provided. The heating floor 30 includes a number of heating tiles 300 disposed side by side to from a number of rows and lines.

Referring to FIGS. 13 to 16, the heating tile 300 includes a first side surface 3002, a second side surface 3004, a first electrode 3062 and a second electrode (not shown). In every two adjacent heating tiles 300 of every line, the first side surface 3002 of one heating tile 300 is contacting with the second side surface 3004 of another heating tile 300. The first electrode 3062 and the second electrode are both oriented from the first side surface 3002 and the second side surface 3004. A length of the first electrode 3062 or the second electrode is longer than a distance between the first side surface 3002 and the second side surface 3004. The two exposed first ends of the first electrode 3062 protrude the first side surface 3002 and the second side surface 3004 and are folded to form two first flexible sheets 3068. The two exposed second ends of the second electrode protrude from the first side surface 3002 and the second side surface 3004 and are folded to form two second flexible sheets 3070.

The heating tile 300 further includes two tubes 3006 disposed on the first side surface 3002. Each tube 3006 defines a hollow structure. One of the first flexible sheets 3068 is disposed adjacent with the first side surface 3002 and is disposed in one tubes 3006, one of the second flexible sheets 3070 is disposed adjacent with the first side surface 3004 and is disposed in the other one tubes 3006. The two tubes 3006 can be fixed on the first side surface 3002 by adhesive or mechanical force. In another embodiment, parts of the two tubes 3006 can be inserted in the first side surface 3002. The second side surface 3004 includes two grooves 3008. One of the first flexible sheets 3068, disposed adjacent to the second side surface 3004, is disposed in one groove 3008. One of the second flexible sheets 3070, adjacent to the second side surface 3004, is disposed in the other groove 3008. The two grooves 3008 have the same shape as the two tubes 3006, a length of the two tubes 3006 is equal to a depth of the grooves 3008. As such, in every two adjacent heating tiles 300, each of the tubes 3006 of one heating tile 300 is embedded/engaged in each of the grooves 3008 of another heating tile 300. The first flexible sheet 3068 and the second flexible sheet 3070, disposed in the tubes 3006, separately contact the first flexible sheet 3068 and the second flexible sheet 3070, disposed in the grooves 3008. As such, in every line, the heating tiles 300 can be fixed with each other firmly. The first electrode 3062 and the second electrode can be protected by the tubes 3006 and the grooves 3008 from being polluted. Other characteristics of the heating floor 30 are the same as the heating floor 10 disclosed above.

Figure 17:
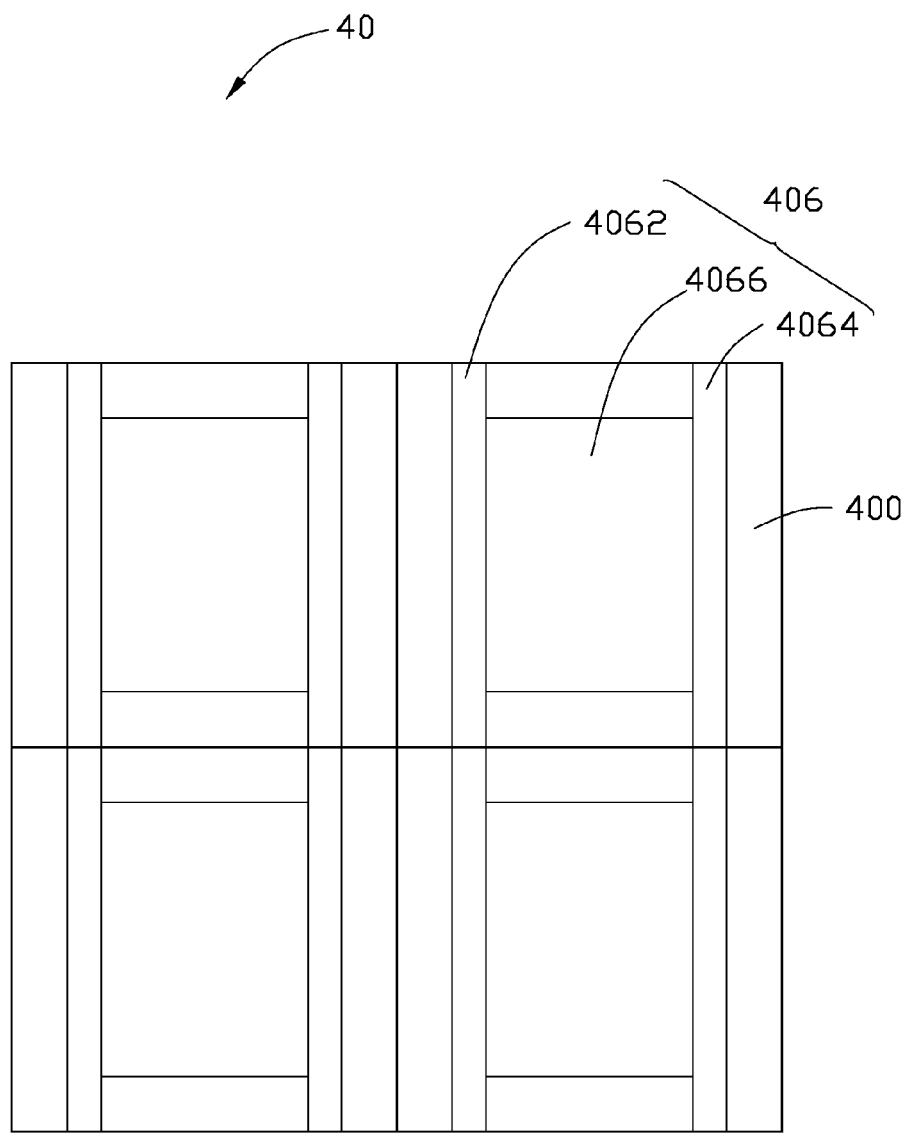
FIG. 17 is a schematic, top plan view of still another embodiment of a heating floor.

Referring to FIG. 17, a heating floor 40 according to still another embodiment is provided. The heating floor 40 includes a number of heating tiles 400 disposed side by side to from a number of rows and lines.

Figure 18:
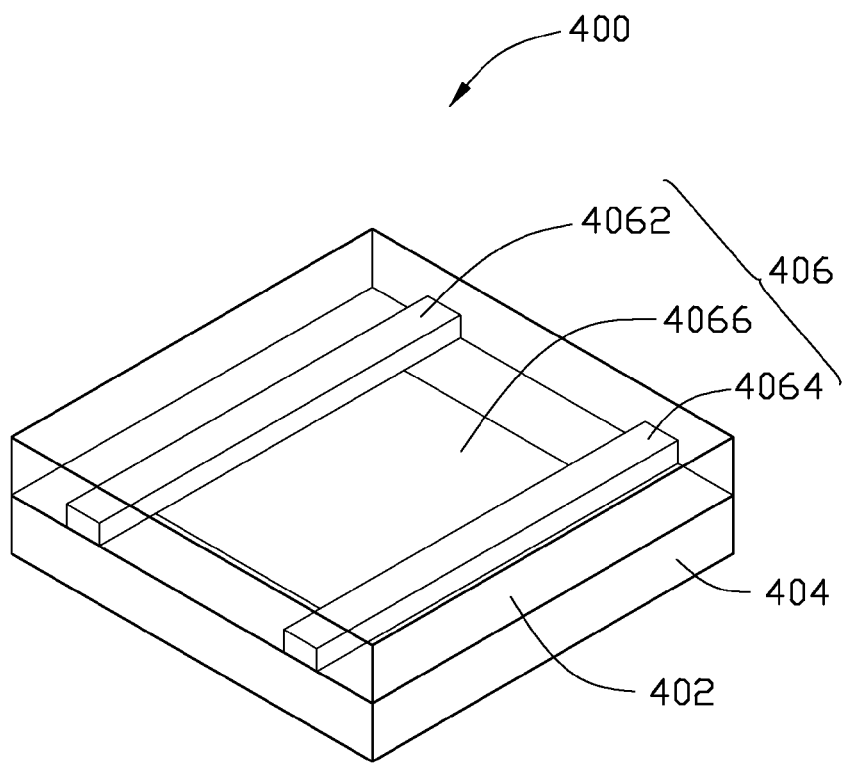
FIG. 18 is a schematic view of a heating tile used in the heating floor of FIG. 17.

Referring to FIG. 18 each heating tile 400 includes an upper substrate 402, a lower substrate 404 and a heating module 406 disposed between the upper substrate 402 and the lower substrate 404. The heating module 406 includes a heating element 4066, a first electrode 4062 and a second electrode 4064.

The upper substrate 402 can be transparent in all or just some wavelengths, including IR wavelengths. Materials of the upper substrate 402 and the lower substrate 404 can be glass, quartz or transparent polymer. The lower substrate 404 can be transparent, too. The heating element 4066 includes a carbon nanotube layer structure. When a temperature of the carbon nanotube structure raises, the carbon nanotube layer structure can emit the heat in a form of IR light, and the IR light has a high transmitting rate trough the transparent upper substrate 402, and as such, the heating tile 400 has a high efficiency. Further, when the temperature of the carbon nanotube layer structure is high enough, the carbon nanotube layer structure can emit visible light, and the heating tile 400 can be used as a light source.

In other embodiments, the heating floor 40 can further include a heat-insulated sheet disposed on the heating tiles 400. The heat-insulated sheet will diffuse the heat and keep a temperature of the surface of the heating floor 40 relatively low. Thus, human skin can come into direct contact with the heating floor 40. The heat-insulated sheet can be transparent and the heat-insulated sheet will not affect the visible light emitted by the heating tile 400. A material of the heat-insulated sheet can be glass, quartz or transparent polymer.

Other characteristics of the heating floor 40 are the same as the heating floor 10 disclosed above.

It is to be understood that the above-described embodiments are intended to illustrate rather than limit the present disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What is claimed is:

1. A heating tile comprising:
a first side surface and a second side surface opposite to each other;
an upper substrate;
a lower substrate;
a heating module disposed between the upper substrate and the lower substrate, the heating module comprising a first electrode, a second electrode separated from the first electrode, and a heating element being electrically connected with the first electrode and the second electrode, wherein the heating element comprises a carbon nanotube layer structure, the first electrode and the second electrode are oriented from the first side surface toward the second side surface; and
wherein the first electrode comprises two exposed first ends, and the second electrode comprises two exposed second ends, the two exposed first ends and the two exposed second ends protrude from the first side surface and the second side surface, the first electrode comprises two first conductive sheets separately disposed on the two exposed first ends, one of the two conductive first sheets is disposed on a first side surface, the other one of the two conductive first sheets is disposed on a second side surface, and the second electrode comprises two second conductive sheets separately disposed on the two exposed first ends, one of the two second conductive sheets is disposed on a first side surface, the other one of the two second conductive second sheets is disposed on a second side surface.

2. The heating tile of claim 1, wherein the first electrode and the second electrode are parallel with each other.

3. The heating tile of claim 1, wherein the carbon nanotube layer structure comprises at least one carbon nanotube film comprising a plurality of carbon nanotubes substantially parallel with each other.

4. The heating tile of claim 3, wherein the plurality of carbon nanotubes in the at least one carbon nanotube film form a plurality of carbon nanotube segments joined end-to-end.

5. The heating tile of claim 3, wherein the first electrode and the second electrode are parallel with each other, and the plurality of carbon nanotubes in the at least one carbon nanotube film are substantially perpendicular to the first electrode and the second electrode.

6. The heating tile of claim 1, further comprising a heat-reflective layer disposed between the lower substrate and the heating element.

7. The heating tile of claim 6, wherein material of the heat-reflective layer comprises an IR-reflective material that is selected form the group consisting of $TiO_2$—Ag—$TiO_2$, ZnS—Ag—ZnS, AlNO—Ag-AlN, $Ta_2O_3$—SiO and $Nb_2O_3$—$SiO_2$.

8. The heating tile of claim 1, further comprising a concave disposed on the first side surface and a protrusion disposed on the second side surface, the concave and the protrusion are located opposite with each other.

9. The heating tile of claim 8, wherein the concave and the protrusion have corresponding shapes.

\* \* \* \* \*